United States Patent [19]
Self

[11] Patent Number: 5,217,201
[45] Date of Patent: Jun. 8, 1993

[54] HOT WATER FAUCET SAFETY APPARATUS

[76] Inventor: Donnie E. Self, 11852 Mt. Vernon #627, Grand Terrace, Calif. 92324

[21] Appl. No.: 901,572

[22] Filed: Jun. 19, 1992

[51] Int. Cl.$^5$ .............................. F16K 31/44
[52] U.S. Cl. ..................... 251/90; 251/109; 251/111
[58] Field of Search ............... 251/90, 109, 111, 114

[56] References Cited

U.S. PATENT DOCUMENTS

| | | | |
|---|---|---|---|
| 806,309 | 12/1905 | White | 251/90 |
| 1,651,038 | 11/1927 | Muller | 251/90 X |
| 1,689,236 | 10/1928 | Fraser | 251/90 X |
| 2,059,733 | 11/1936 | Heisser | 251/90 X |

*Primary Examiner*—Alan Cohan
*Attorney, Agent, or Firm*—Leon Gilden

[57] ABSTRACT

An apparatus receiving a valve stem through a central support tube includes a housing extending upwardly relative to a rear distal end of the support tube. The valve stem includes a truncated conical handle mounted at an outer distal end of the valve stem, with a plurality of spring legs mounted adjacent a forward distal end of an exterior surface of the support tube projecting into the handle to frictionally engage an interior surface of the handle retarding rotation thereof preventing children and the like from inadvertent and unauthorized rotation of a hot water handle of a hot water valve minimizing injury. Displacement of the spring fingers relative to the handle is effected by lifting of a lift handle mounted to an upper distal end of the control housing.

4 Claims, 3 Drawing Sheets

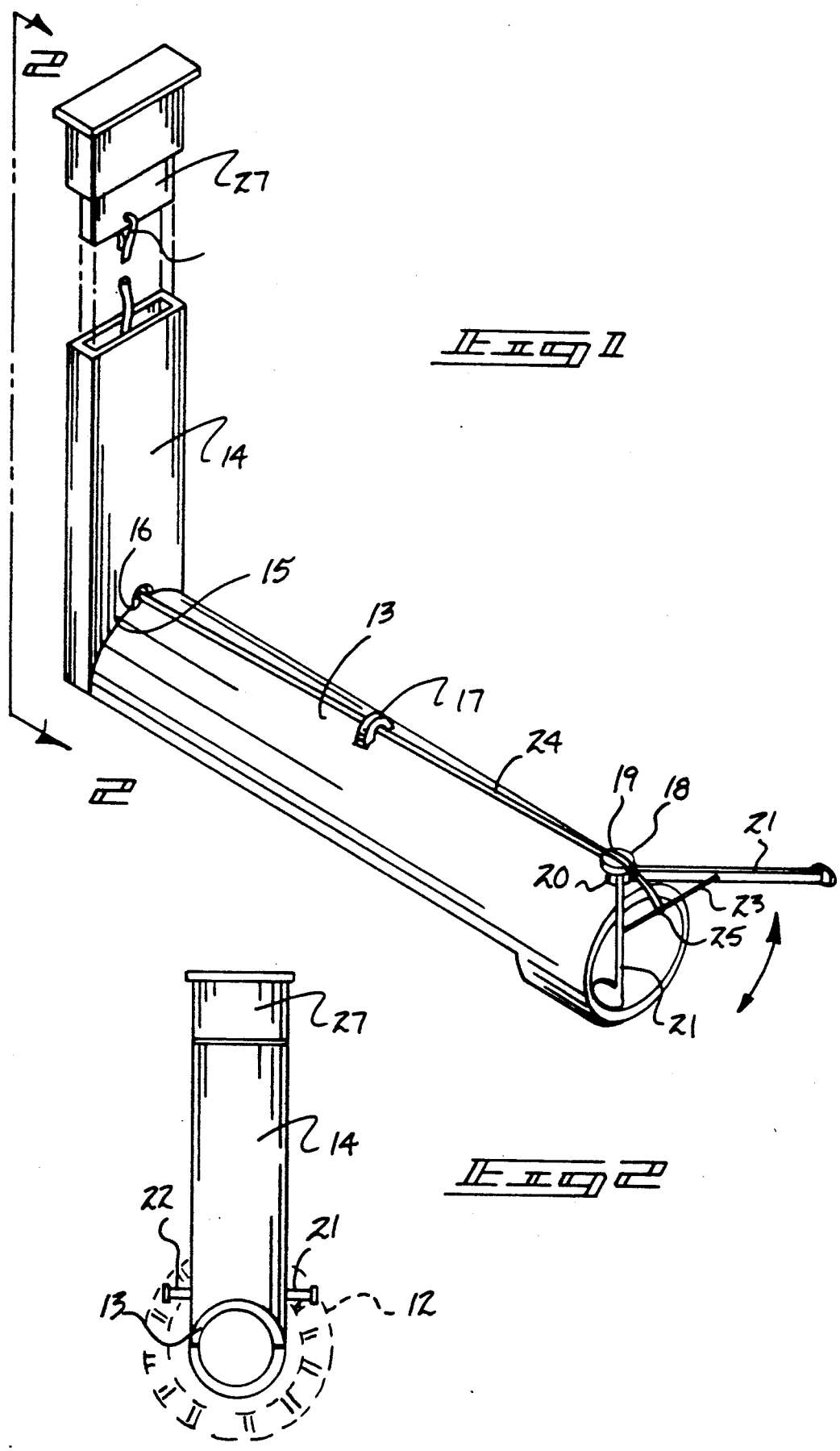

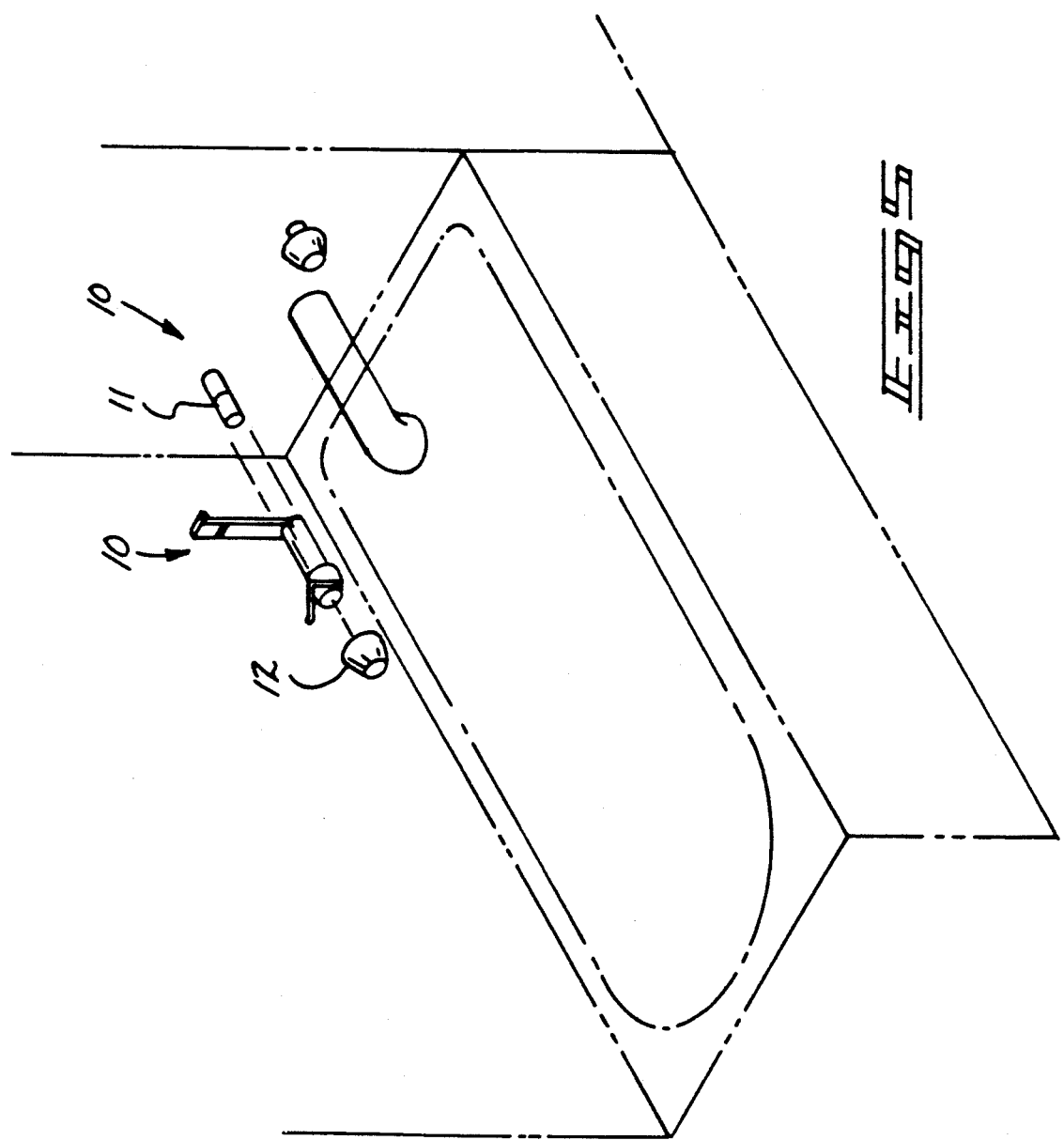

HOT WATER FAUCET SAFETY APPARATUS

BACKGROUND OF THE INVENTION

1. Field of the Invention

The field of invention relates to faucet apparatus, and more particularly pertains to a new and improved hot water faucet safety apparatus wherein the same is arranged to project friction fingers interiorly of a control handle to prevent unauthorized use of the hot water faucet.

2. Description of the Prior Art

Children and the like are subject to injury by the inadvertent rotation and opening of a hot water valve directing hot water flow therethrough to effect scalding and other such injury resultant from skin contact relative to a hot water exposure. The instant invention attempts to overcome deficiencies of the prior art by providing for a control organization retrofitted relative to a hot water handle preventing unauthorized rotation thereof and in this respect, the present invention substantially fulfills this need.

SUMMARY OF THE INVENTION

In view of the foregoing disadvantages inherent in the known types of faucet apparatus now present in the prior art, the present invention provides a hot water faucet safety apparatus wherein the same prevents unauthorized rotation of the hot water faucet by frictional engagement of spring fingers interiorly of the faucet. As such, the general purpose of the present invention, which will be described subsequently in greater detail, is to provide a new and improved hot water faucet safety apparatus which has all the advantages of the prior art fluid valve apparatus and none of the disadvantages.

To attain this, the present invention provides an apparatus receiving a valve stem through a central support tube, including a housing extending upwardly relative to a rear distal end of the support tube. The valve stem includes a truncated conical handle mounted at an outer distal end of the valve stem, with a plurality of spring legs mounted adjacent a forward distal end of an exterior surface of the support tube projecting into the handle to frictionally engage an interior surface of the handle retarding rotation thereof preventing children and the like from inadvertent and unauthorized rotation of a hot water handle of a hot water valve minimizing injury. Displacement of the spring fingers relative to the handle is effected by lifting of a lift handle mounted to an upper distal end of the control housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved hot water faucet safety apparatus which has all the advantages of the prior art fluid valve apparatus and none of the disadvantages.

It is another object of the present invention to provide a new and improved hot water faucet safety apparatus which may be easily and efficiently manufactured and marketed.

It is a further object of the present invention to provide a new and improved hot water faucet safety apparatus which is of a durable and reliable construction.

An even further object of the present invention is to provide a new and improved hot water faucet safety apparatus which is susceptible of a low cost of manufacture with regard to both materials and labor, and which accordingly is then susceptible of low prices of sale to the consuming public, thereby making such hot water faucet safety apparatus economically available to the buying public.

Still yet another object of the present invention is to provide a new and improved hot water faucet safety apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the control organization.

FIG. 2 is an orthographic view, taken along the lines 2—2 of FIG. 1 in the direction indicated by the arrows.

FIG. 5 is an isometric illustration of the invention in use relative to the various components of the water valve associated therewith.

DESCRIPTION OF THE PREFERRED EMBODIMENT

Figure 3:
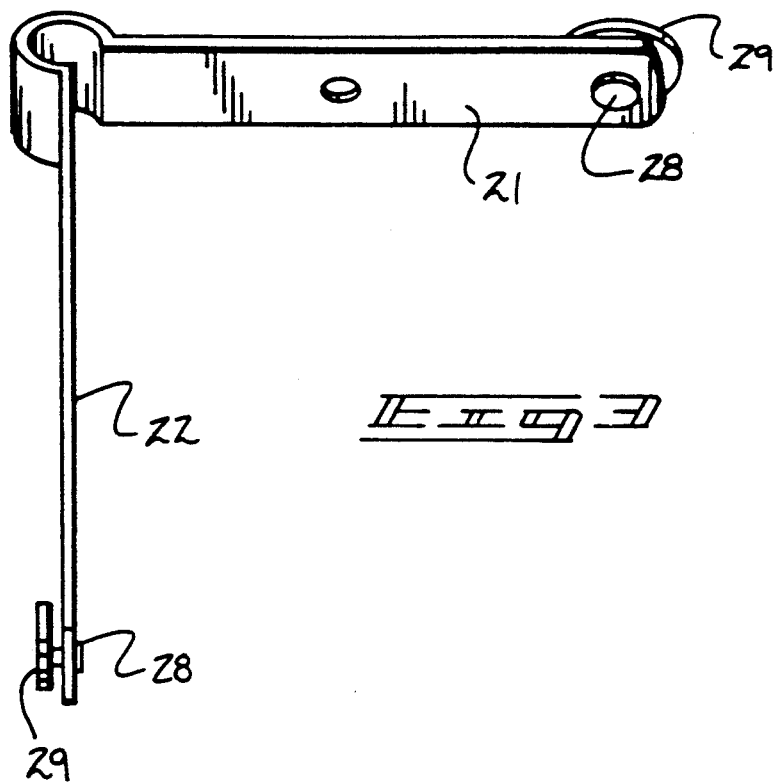
FIG. 3 is an isometric illustration of the spring finger structure utilized by the invention.

With reference now to the drawings, and in particular to FIGS. 1 to 5 thereof, a new and improved hot water faucet safety apparatus embodying the principles and concepts of the present invention and generally designated by the reference numeral 10 will be described.

More specifically, the hot water faucet safety apparatus 10 of the instant invention essentially comprises cooperation with a hot water valve stem 11 having a truncated conical handle 12 mounted at an outer distal end of the valve stem. A central support tube 13 receives the valve stem 11 therethrough. A control housing 14 extends orthogonally and upwardly relative to a rear distal end of the support tube, with the housing having a housing lower end 15 fixedly mounted to the support tube. The housing lower end 15 includes a central opening 16 medially of the lower end to permit the relative sliding of a control cable 24 therethrough. A guide loop 17 coaxially aligned relative to the lower end central opening 16 receives the control cable 24 therethrough to direct and control the control cable 24 to overlying orientation relative to a guide boss 18, and more specifically to a guide boss slot 19. A guide boss body 20 positoned below the guide boss head 18 includes a respective first and second spring leg 21 and 22 that are biased apart to define an oblique angle therebetween mounted about the body 20. A support cable 23 is secured between the spring legs 21 and 22, with the control cable 24 having a control cable first end 25 mounted and secured to the support cable 23. A control cable second end 26 is secured to a control housing lift handle 27 that in turn is slidably mounted within an upper distal end of the control housing 14. Upon lifting of the lift handle 27, tensioning of the support cable 23 is effected biasing the spring fingers towards one another. In a normal orientation, the spring fingers 21 and 22 are biased apart for engagement with an interior surface of the truncated conical handle 12 minimizing rotation of the handle or preventing same by children and the like. In use, an adult or older child merely lifts the lift handle 27 to displace the outer distal ends of the spring legs 21 and 22 in a spaced relationship relative to the interior surface of the truncated conical handle 12 preventing ease of rotation of the handle.

Figure 4:
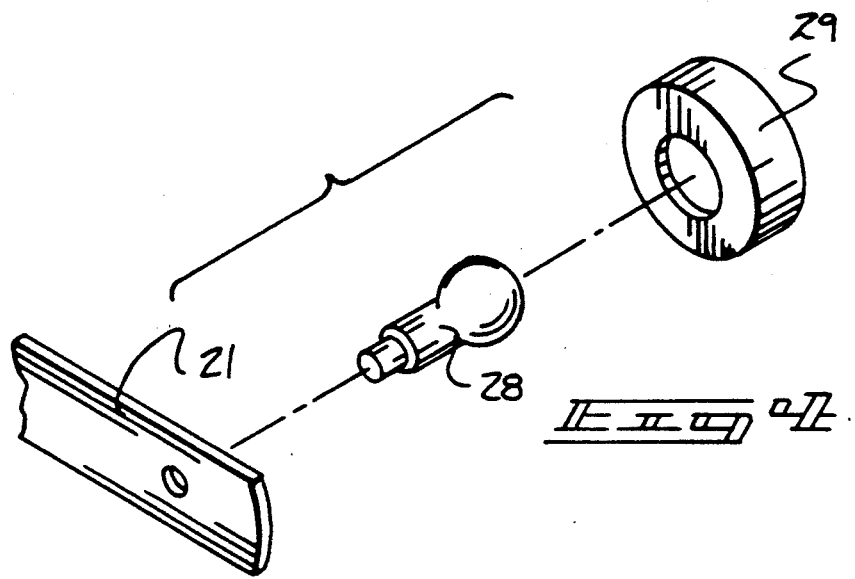
FIG. 4 is an isometric exploded view of the friction pad structure of the outer distal ends of the spring fingers.

The FIGS. 3 and 4 note that the spring legs 21 and 22 having the outer distal ends include a support head 28 orthogonally mounted relative to the outer distal ends, with the control housing extending exteriorly of each spring finger towards the interior surface of the truncated conical handle 12. The support head includes a polymeric friction cup 29 removably mounted relative to the support head 28 to permit replacement of the polymeric friction cup to maintain the frictional engagement of the spring legs relative to the interior surface to prevent the associated rotation of the handle 12 for unauthorized use thereof.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompossed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hot water faucet safety apparatus arranged for securement about a hot water valve stem having a truncated conical handle mounted at a forward distal end of the valve stem, wherein the apparatus comprises, a central support tube receiving the valve stem therethrough, the central support tube having a central support tube rear distal end and a control housing orthogonally mounted to the central support tube at the rear distal end extending upwardly relative to the central support tube, and a lift handle mounted slidably relative to an upper distal end of the control housing, and control means extending from the lift handle through the control housing and along the central support tube for reciprocation relative to the central support tube upon reciprocation of the lift handle relative to the control housing, and engagement means mounted to the control means for biased engagement relative to an interior surface of the truncated conical handle in a first position and spaced from the interior surface of the truncated conical handle when the lift handle effects manipulation of the control means.

2. An apparatus as set forth in claim 1 wherein the control means includes a control cable, and the control housing includes a control housing lower end, the control housing lower end includes a central opening, and the central support tube includes a guide loop, the guide loop coaxially aligned with the central opening, and the control cable including a control cable first end mounted to the lift handle, and the control cable extending through the central opening and the guide loop, with the control cable including a second end secured to the engagement means.

3. An apparatus as set forth in claim 2 including a guide boss body mounted to a forward distal end of the support tube coaxially aligned with the central opening, and the guide boss body including a guide boss head, the guide boss head including a slot, with the control cable directed through the guide boss slot, and the engagement means includes a first spring leg and a second spring leg joined together at a junction, with the junction secured about the guide boss body, and the engagement means further including a support cable extending between the first spring leg and the second spring leg secured to the first spring leg and the second spring leg, with the control cable second end secured to the support cable, and the first spring leg and the second spring leg normally biased apart in the first position, with the first spring leg and the second spring leg directed towards one another to the second position when the reciprocation of the control cable along the central support tube upon lifting of the lift handle effects tensioning of the support cable.

4. An apparatus as set forth in claim 3 wherein the first spring leg and the second spring leg include respective first and second outer distal ends, and each outer distal end includes a support head extending exteriorly of each spring leg, and each support head includes a polymeric friction cup mounted to each support head, with each friction cup arranged for engagement with the interior surface of the truncated conical handle.

* * * * *